United States Patent
Bower, III et al.

(10) Patent No.: US 10,097,571 B2
(45) Date of Patent: Oct. 9, 2018

(54) TRACKING CLOUD WORKLOADS TO ISOLATE SECURITY BREACH EXPOSURE

(71) Applicant: LENOVO ENTERPRISE SOLUTIONS (SINGAPORE) PTE. LTD., Singapore (SG)

(72) Inventors: Fred Allison Bower, III, Durham, NC (US); Gary David Cudak, Wake Forest, NC (US); Ajay Dholakia, Cary, NC (US); William Gavin Holland, Cary, NC (US); Scott Kelso, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 233 days.

(21) Appl. No.: 15/078,521

(22) Filed: Mar. 23, 2016

(65) Prior Publication Data
US 2017/0279825 A1    Sep. 28, 2017

(51) Int. Cl.
*H04L 29/06*    (2006.01)
*H04L 29/08*    (2006.01)
*H04L 12/24*    (2006.01)

(52) U.S. Cl.
CPC ...... *H04L 63/1425* (2013.01); *H04L 41/0677* (2013.01); *H04L 41/0853* (2013.01); *H04L 41/28* (2013.01); *H04L 63/123* (2013.01); *H04L 63/1441* (2013.01); *H04L 67/10* (2013.01); *H04L 2463/121* (2013.01)

(58) Field of Classification Search
CPC ....... H04L 63/12; H04L 63/123; H04L 63/14; H04L 63/1408; H04L 63/1425; H04L 63/1441; H04L 67/10; H04L 2463/121; H04L 41/06; H04L 41/0631; H04L 41/0645; H04L 41/0654; H04L 41/0677; H04L 41/069; H04L 41/085; H04L 41/0853; H04L 41/28; G06F 9/5072
See application file for complete search history.

(56) References Cited

U.S. PATENT DOCUMENTS

| | | | | |
|---|---|---|---|---|
| 8,037,187 B2 * | 10/2011 | Dawson | ................ | G06F 9/5072 370/254 |
| 8,429,630 B2 * | 4/2013 | Nickolov | ............... | G06F 9/4856 717/110 |
| 9,442,769 B2 * | 9/2016 | Ferris | ..................... | G06F 9/505 |
| 9,442,771 B2 * | 9/2016 | Morgan | ................ | G06F 9/5072 |

FOREIGN PATENT DOCUMENTS

IN    201202750 I1  *  9/2015

* cited by examiner

*Primary Examiner* — Zachary A. Davis
(74) *Attorney, Agent, or Firm* — Jason Friday; Andrew M. Calderon; Roberts Mlotkowski Safran Cole & Calderon, P.C.

(57) ABSTRACT

A computer-implemented method includes receiving, by a computing device within a networking environment, a workload for execution within the networking environment; initiating, by the computing device, transfers of the workload to a plurality of network elements within the cloud networking environment; providing, by the computing device, tracking information of the workload as the workload traverses through the plurality of network elements; and storing or outputting, by the computing device, the tracking information regarding of the workload.

18 Claims, 6 Drawing Sheets

TRACKING CLOUD WORKLOADS TO ISOLATE SECURITY BREACH EXPOSURE

TECHNICAL FIELD

The present disclosure relates to identifying the impact of security breaches, and more particularly, to identifying workloads affected by security breaches.

BACKGROUND

In public cloud computing applications, clients who dispatch workloads to a provider's cloud network for execution must trust the cloud provider to protect information about the workload and data computed from the workload in the provider's cloud infrastructure. Typically, that trust is based upon anonymity (e.g., the difficulty in identifying targets for attack in the vastness of the cloud infrastructure) and the overall security of the cloud infrastructure in which the workload is dispatched (e.g., the security provisions enforced in the cloud network, and the cloud infrastructure's general resistance to attacks by malicious parties). Cloud users may be reluctant to dispatch sensitive workloads since cloud users cannot be certain that workloads will not be compromised during execution, and further cannot isolate a particular workload being compromised from a general compromise of any element of a cloud infrastructure.

Typically, workloads are protected by "big fences", e.g., security measures designed to keep bad actors out of the cloud network, preventing breaches of hosted workloads. Security measures may also include log analysis of the intersection of workload and host equipment maintained by the cloud provider. The client or user of the cloud must place trust in the cloud provider to identify breaches and communicate their affected domain. In instances where a client does not maintain detailed records of the workload dispatch, the cloud provider's information regarding a breach may not be sufficient to isolate exposure from a security breach, leading to a need to invalidate unnecessarily large blocks of computation (data and results) based upon imprecision in the tracking of what elements were affected by a breach.

In the event of an attack on the cloud infrastructure, cloud users may not be able to isolate information identifying whether their workloads are compromised or not. As a result, when an attack on a cloud occurs, cloud users may be forced to invalidate, discard, or take other security measures, even if the cloud user's workload was not impacted by the attack, e.g., if there is a general compromise of an element on the cloud network infrastructure in which the compromised element did not carry the user's workload.

SUMMARY

In an aspect of the disclosure, a computer-implemented method includes receiving, by a computing device within a networking environment, a workload for execution within the networking environment; initiating, by the computing device, transfers of the workload to a plurality of network elements within the cloud networking environment; providing, by the computing device, tracking information of the workload as the workload traverses through the plurality of network elements; and storing or outputting, by the computing device, the tracking information regarding the workload.

In an aspect of the disclosure, there is a computer program product for tracking network elements that handled a workload within a networking environment. The computer program product includes a computer readable storage medium having program instructions embodied therewith. The program instructions are executable by a computing device within the networking environment to cause the computing device to identify network elements within the networking environment that have been in possession of the workload as part of executing the workload within the networking environment; provide a digital signature of the identified network elements in a workload log; and identify, based on the workload log, which network elements hosted the workload.

In an aspect of the disclosure, a system includes: a CPU, a computer readable memory and a computer readable storage medium associated with a computing device; program instructions to identify network elements within a networking environment that have been compromised by a security breach; and program instructions to identify which workload has traversed or been executed on a particular compromised network element based on a workload log. The program instructions are stored on the computer readable storage medium for execution by the CPU via the computer readable memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
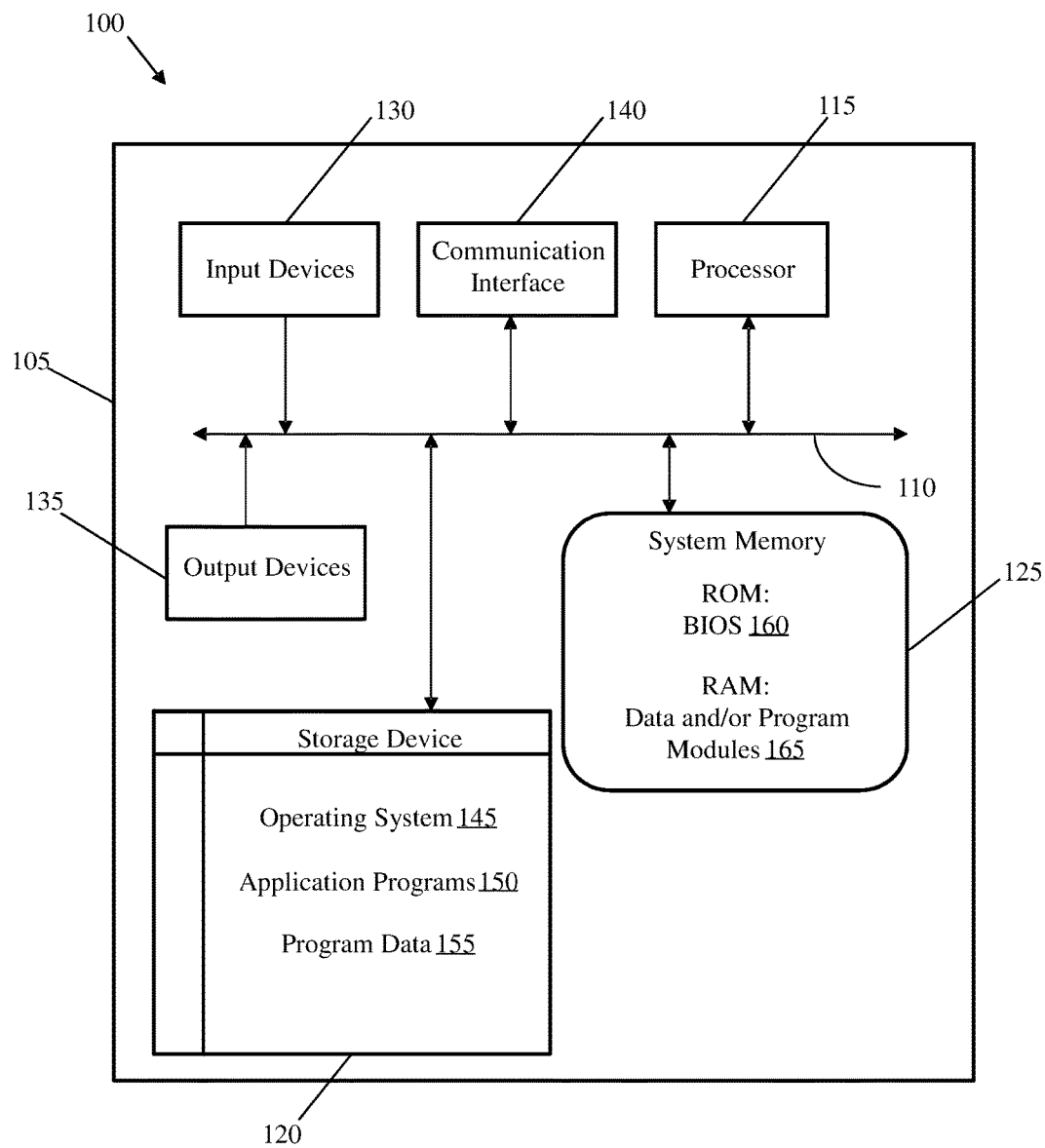
FIG. 1 shows an illustrative architecture of a computing system implementing aspects of the present disclosure.

The present disclosure relates to identifying the impact of security breaches, and more particularly, may identify workloads affected by security breaches. In embodiments, a cloud provider (e.g., a provider of cloud network services) may provide fine-grained identification of client workloads and data affected by a breach or compromise of the provider's cloud infrastructure. In embodiments, digital signatures can be used to generate a tamper-evident log of the "chain of custody" of a client's workload and its associated data as the workload (or portion of a workload) traverses the cloud provider's network infrastructure. In this way, a workload is tracked within the cloud as the workload is transferred between multiple network elements within the cloud.

As described herein, the "network elements" can be all cloud or network infrastructure that is involved working on a particular job or workload. For example, as described herein, the workload can be tracked as it is transferred between network elements, such as servers, storage arrays, and/or other devices that host, process, and/or execute the workload.

When a breach is detected, the provider can publish the list of affected network elements (e.g., servers, storage arrays, and/or other physical devices that host, process, and/or execute the workload) and a customer/user of the cloud provider's cloud can use this published information as a filter to identify any exposed workload and data elements based upon finding all workloads and data affected by a compromised element of the cloud. A breach can be any particular type of security breach.

By using tamper-evident logging of custody to "color" the workload and data in the cloud, an attacker cannot cover their tracks as easily, as the marking of workloads would be handled at a level above the individual elements hosting it in the cloud. Further, a compromise of the signing elements merely degrades to the existing state of the art in terms of isolation of exposure.

As described herein, aspects of the present disclosure log custody of a workload in a digitally-signed format to generate a digitally-signed custody log, which identifies the network elements of a cloud provider's cloud network infrastructure that handled a workload. Further, the systems and processes described herein use the digitally-signed custody log for tracking data computed by the workload while traversing the cloud infrastructure. Systems and/or methods are also provided to conduct post-breach analysis of the custody log on all cloud-dispatched workloads to identify breached workloads and data at a fine level of granularity.

Advantageously, as a result of using the secure logging described herein, a set of workloads and data that must be quarantined or considered breached can be readily identified based upon isolation of exposure to the breached systems within certain time windows. For example, only those workloads (or portions of workloads) that have been handled by a compromised network element would be identified as compromised as opposed to all workloads dispatched to the cloud provider's cloud network. As a result, a finite set of workloads can be identified for remediation, saving users a substantial amount of time and computing resources and limiting the liability of the cloud provider in the event of a security breach (e.g., any type of breach in which the execution or data of a workload may be compromised).

FIG. 1 shows an illustrative architecture of a computing system implementing aspects of the present disclosure. The computing system 100 is only one example of a suitable computing system and is not intended to suggest any limitation as to the scope of use or functionality of the embodiments described herein. The computing system 100 includes a computing device 105. The computing device 105 can be resident on a network infrastructure such as within a cloud environment (shown in FIG. 2), or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, the bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of the computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, the processor 115 interprets and executes the processes, steps, functions, and/or operations of one or more embodiments described herein, which may be operatively implemented by the computer readable program instructions. For example, the processor 115 may track the "chain of custody" of a workload throughout a cloud infrastructure and allow a way to identify if a workload passed through a breached or compromised system. More specifically, the processor 115 may maintain a workload log that identifies network elements through which the workload traversed. In alternative embodiments, the processor 115 may allow different network elements to edit a workload log that includes information that tracks the workload as it traverses within a cloud infrastructure. The processor 115 may allow the network elements to digitally sign the log each time the log is edited. In this way, it is possible to track the workload and, upon a compromise or breach of a network element, it is now possible to specifically identify which workloads were handled by the compromised network element at the time of the breach.

In embodiments, processor 115 may receive input signals from one or more input devices 130 and/or drive output signals through one or more output devices 135. The input devices 130 may be, for example, a keyboard or touch sensitive user interface (UI). The output devices 135 can be, for example, any display device, printer, etc.

The storage device 120 may include removable/non-removable, volatile/non-volatile computer readable media, such as, but not limited to, non-transitory media such as magnetic and/or optical recording media and their corresponding drives. The drives and their associated computer readable storage media provide for storage of computer readable program instructions, data structures, program modules and other data for operation of computing device 105 in accordance with the different aspects of the present disclosure. In embodiments, storage device 120 may store operating system 145, application programs 150, and program data 155 that perform the processes of one or more embodiments.

The system memory 125 may include a computer readable storage medium, including for example, non-transitory media such as flash memory, permanent memory such as read-only memory ("ROM"), semi-permanent memory such as random access memory ("RAM"), any other suitable type of storage component, or any combination thereof. A computer readable storage medium, as used herein, is not to be construed as being a transitory signal per se. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to track a workload as the workload is transferred between and hosted on network elements within a cloud network. For example, the computing system 100 may identify which workloads were possessed by network components within the cloud network. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the results of such tasks in accordance with aspects of the present disclosure. The steps, methods and/or functionality disclosed herein can be implemented in any combination of hardware circuitry and software.

Figure 2:
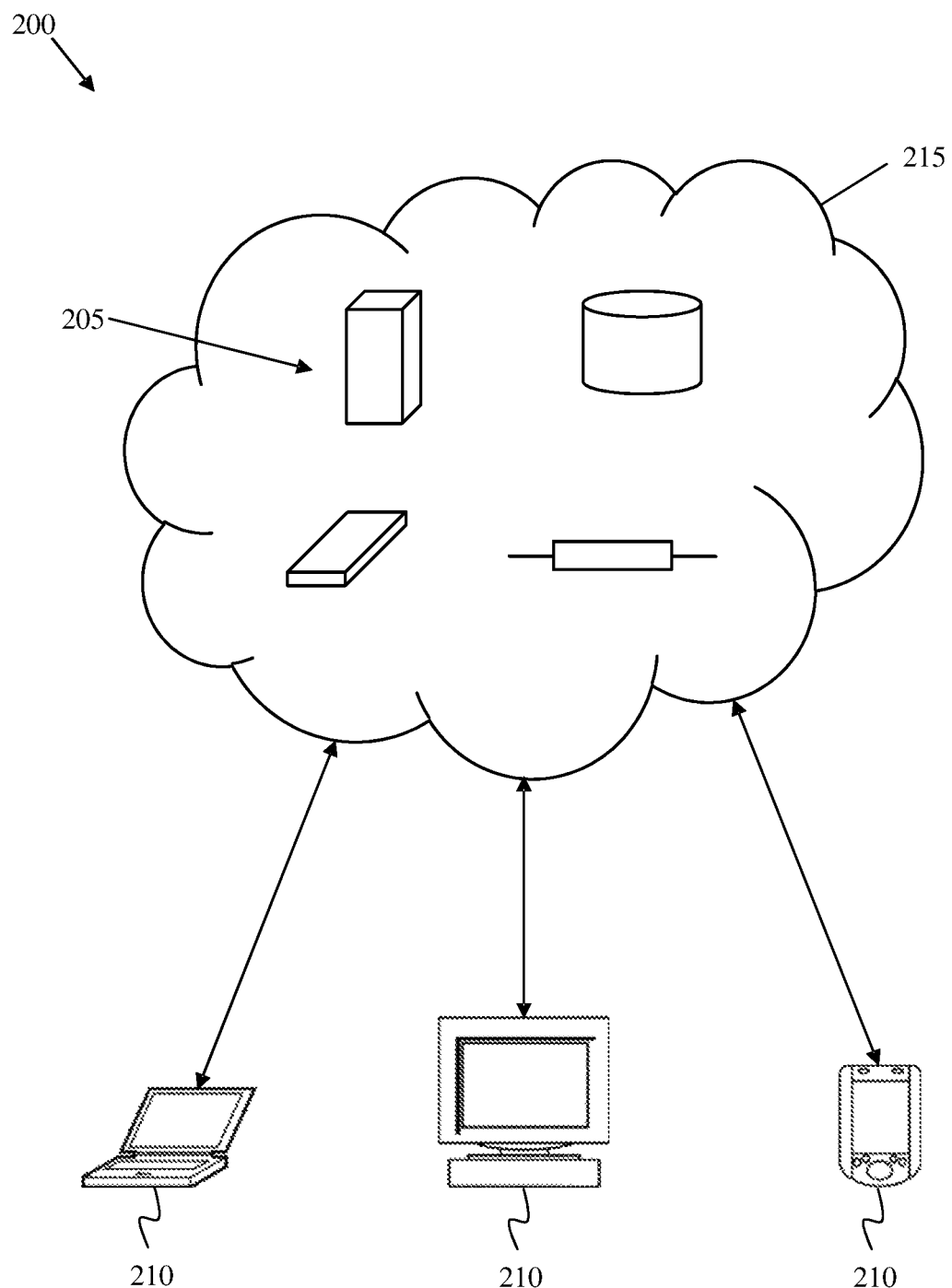
FIG. 2 shows an exemplary cloud computing environment in accordance with aspects of the present disclosure.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. In particular, the cloud resources 205 can be representative of any network element of the cloud. In embodiments, as the workload traverses through the network elements, a workload log can be updated with identification information in order to enable a user to track which network elements were traversed by the workload. Accordingly, in embodiments, cloud resources 205 may be configured to track a workload received from client device 210 as the workload traverses cloud resources 205. For example, as described herein, cloud resources 205 may include an orchestration server to track a workload as the workload traverses network elements of cloud resources 205.

Cloud resources 205 may be on a single network or a distributed network. Cloud resources 205 may be distributed across multiple cloud computing systems and/or individual network enabled computing devices.

Client devices 210 may comprise any suitable type of network-enabled computing device, such as servers, desktop computers, laptop computers, handheld computers (e.g., smart phones, tablet computers), set top boxes, and network-enabled hard drives. Client devices 210 may output workloads to cloud resources 205 for processing within the cloud environment.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

Figure 3:
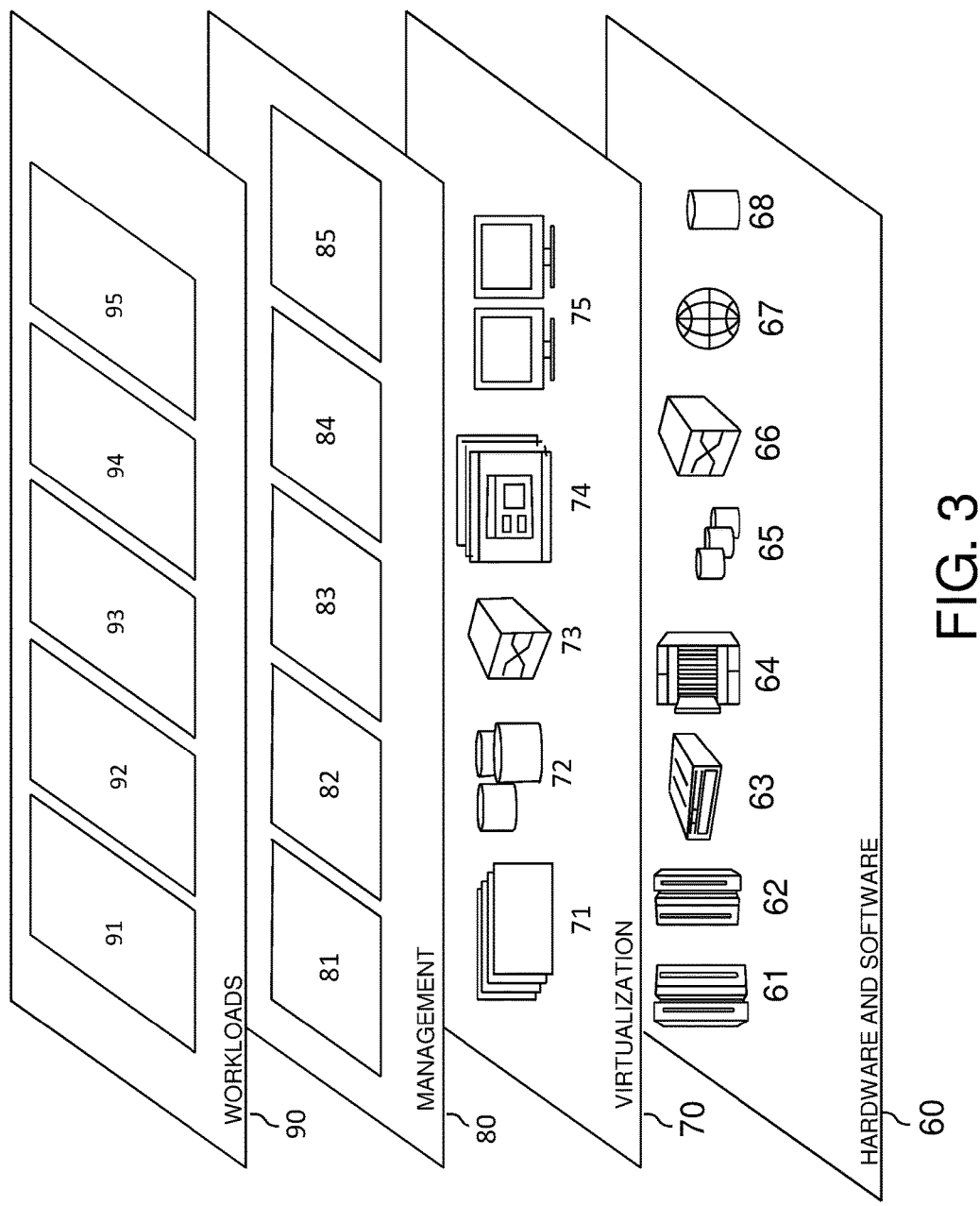
FIG. 3 shows a set of functional abstraction layers provided by a cloud computing environment in accordance with aspects of the present disclosure.

Referring now to FIG. 3, a set of functional abstraction layers provided by a cloud computing environment (e.g., the cloud computing environment 200 of FIG. 2) is shown. It should be understood in advance that the components, layers, and functions shown in FIG. 3 are intended to be illustrative only and embodiments described herein of the disclosure are not limited thereto. As depicted, the following layers and corresponding functions are provided within the exemplary cloud computing environment described herein.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In embodiments, one or more functions may be implemented within management layer 80. For example, management layer 80 may include an orchestration server that tracks a workload (received from a client device outside of a cloud network) as the workload traverses network elements within the cloud network as described herein.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 4:
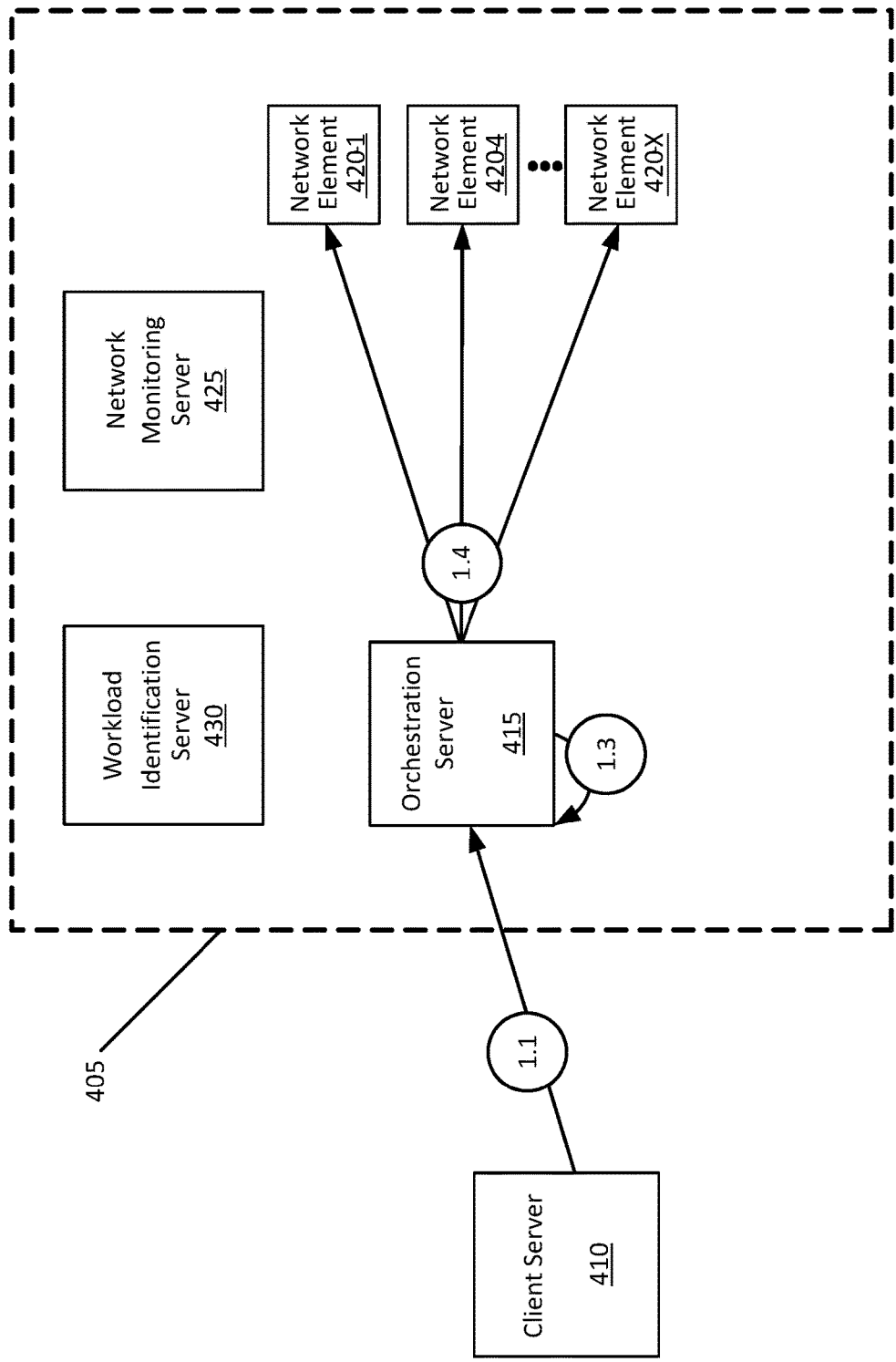
FIG. 4 shows an overview of an example implementation in accordance with aspects of the present disclosure.

FIG. 4 shows an overview of an example implementation in accordance with aspects described herein. As shown in FIG. 4, a client server 410 may communicate with a provider's cloud network 405.

The client server 410 may include one or more computing devices associated with a client or user of a provider's cloud network 405. For example, the client server 410 may include a server or collection of server devices that may dispatch a workload for execution within the cloud network 405. The client server 410 may correspond to client device 210 of FIG. 2.

The cloud network 405 may include a orchestration server 415, network elements 420-1 through network element 420-X (collectively referred to as network elements 420), where X is an integer greater than or equal to 1, a network monitoring server 425, and a workload identification server 430. The network elements 420 may include server devices, storage arrays, etc. that process, host, and/or execute workloads. For example, each network element 420 may implement a particular service or application. A workload may be handled or processed by those network elements 420 that implement the services/applications required for the execution of the workload.

The orchestration server 415 may include one or more computing devices that initiate the transfer of a workload amongst the network elements 420 (e.g., based on the applications/services required to execute the workload). As described herein, the orchestration server 415 may record information (e.g., in a log) identifying the network elements 420 that handle a workload. In embodiments, the orchestration server 415 may output the log to the workload identification server 430. In embodiments, the cloud network 405 may include one or more cloud resources 205 of FIG. 2.

As shown in FIG. 4, the client server 410 may dispatch a workload to the cloud network 405 for execution within the cloud network 405 (step 1.1). For example, the workload may be dispatched from the client server 410 to the cloud network 405 using a client portal, web-based application, and/or other technique as is understood by those of ordinary skill in the art. Illustrative examples of workloads may include workloads associated with financial applications and services, gaming applications, data storage applications, modeling applications, data processing applications, etc.

Upon dispatch of the workload, the workload is executed within the cloud network 405. Execution of the workload within the cloud network 405 may be performed on certain network elements 420 based on the functions, services, and/or applications invoked by the execution of the workload. As an example, if the workload relates to a modeling application, network elements 420 that process data for the modeling application may be used in the execution of the workload. In the example of FIG. 4, the orchestration server 415 may receive the workload to initiate the transfer of the workload between particular network elements 420 that are involved in the processing and execution of the workload (at step 1.4).

As the workload is transferred between the network elements 420, the orchestration server 415 coordinates hosting of the workload in the network and records information regarding the transfer of the workload to the different network elements 420. For example, the orchestration server 415 may store information in a workload log each time that the workload is transferred (Step 1.3). In embodiments, timestamps are included in the workload log. In some cloud configurations, the orchestration server 415 will not have full visibility to all network elements 420 in custody of the workload. In these embodiments, the log can either reflect all possible network elements 420 or, preferably, the network elements 420 that cannot be disambiguated by the orchestration server 415 will log workloads hosted, based upon a marker placed in the workload by the orchestration server 415. Periodically, or upon request, these logs will be merged into the log maintained by the orchestration server 415 in order to provide finer granularity of custody tracking within the cloud infrastructure.

In this way, a log is maintained for the workload which can be used to identify the particular network elements 420 that handled the workload, a time at which the workload was transferred to a particular network element 420, a duration of time at which the workload was in control controlled by the particular network element 420, and/or a time at which the workload was transferred from the particular network element 420 to another network element 420. As described herein, the timestamps can be correlated with a time at which a network element has been compromised in order to identify whether the workload traversed a compromised network element 420 at the time the network element 420 was compromised. In embodiments, the orchestration server 415 may maintain the log and may digitally sign the log when the log is updated. In an alternative embodiment, each network element 420 that handled the workload may edit the log to indicate that the network element 420 hosted the workload, and may digitally sign the log after editing the log. Accordingly, the log may include digital signatures of the network elements 420 that handled the workload, and the workload log may identify the "chain of custody" of the workload based on the digital signatures of each network element 420. Also, timestamps can be provided with the digital signatures by the network elements 420.

As described herein, the log is used to identify different network elements that have been compromised or breached and whether the workload (or portions of the workload handled by various network elements 420) has traversed through a compromised network element of the cloud network 405. As an example, the log can identify that the workload was handled by network element 420-1, network element 420-4, and network element 420-X. Further, it can be determined that a security breach occurred on network element 420-X. By reference to the log, it is now possible to identify that the workload (or portion of workload handled by the network element 420-X) traversed the network element [[420-3]]420-X and may have been compromised. Accordingly, data associated with the workload that was computed, handled, or processed by network element 420-X can be identified as "compromised", and that data can be quarantined, invalidated, or otherwise remediated without the need to take action on all workload data within the cloud environment 405. Accordingly, workload data that was not handled by the network element 420-X need not be remediated.

As another example, the log can identify that the workload was handled by network element 420-1, network element 420-4, and network element 420-X, and a security breach occurred on the network element 420-2 (not shown, but located between 420-1 and 420-4). A determination is made that the workload was not compromised by the security breach, and thus, there is no need to remediate the workload. In this way, systems and/or methods, as described herein, will more effectively isolate and identify particular workloads that have been associated with a security breach so that only a smaller set of workloads need be remediated, as opposed to all workloads handled by the provider's cloud network 405. While the example of FIG. 4 shows that the workload is received by the orchestration server 415 from the client server 410, it is noted, however, that other components may be involved in the receipt and execution of the workload within the cloud network 405.

The network monitoring server 425 may include one or more computing devices that detect a security breach within the cloud network 405. For example, the network monitoring server 425 may detect the security breach using a variety of known security breach detection techniques. The network monitoring server 425 may output information regarding the particular network elements 420 affected by the security breach (e.g., to users and clients of the cloud network 405). Additionally, or alternatively, the network monitoring server 425 may output information regarding the particular network elements 420 affected by the security breach to the workload identification server 430 in order for the workload identification server 430 to identify particular workloads affected by the security breach. Also, individual network elements may be instrumented with intrusion detection software and may report to network monitoring server 425 or orchestration server 415 directly.

The workload identification server 430 may include one or more computing devices that identify workloads affected by a security breach. For example, the workload identification server 430 may obtain information identifying particular network elements 420 compromised by a security breach (e.g., from the network monitoring server 425 or directly from network element 420-1). The workload identification server 430 may determine the workloads that have been affected by the breach based on the logs of the workloads. As described in greater detail herein, the workload identification server 430 may remediate a workload by outputting information to a user of the client server 410 identifying the user's workloads that have been affected by a security breach. Additionally, or alternatively, the workload identification server 430 may quarantine and/or invalidate data from particular workloads compromised by a breach.

The quantity of devices and/or networks in FIG. 4 is not limited to what is shown in FIG. 4. In practice, the environment of FIG. 4 may include additional devices and/or networks; fewer devices and/or networks; different devices and/or networks; or differently arranged devices and/or networks than illustrated in FIG. 4. Also, in some implementations, one or more of the devices of the environment of FIG. 4 may perform one or more functions described as being performed by another one or more of the devices of the environment of FIG. 4. Devices of the environment of FIG. 4 may interconnect via wired connections, wireless connections, or a combination of wired and wireless connections. Further, the devices of FIG. 4 may include one or more of the components of the computing system 100 of FIG. 1.

Figure 5:
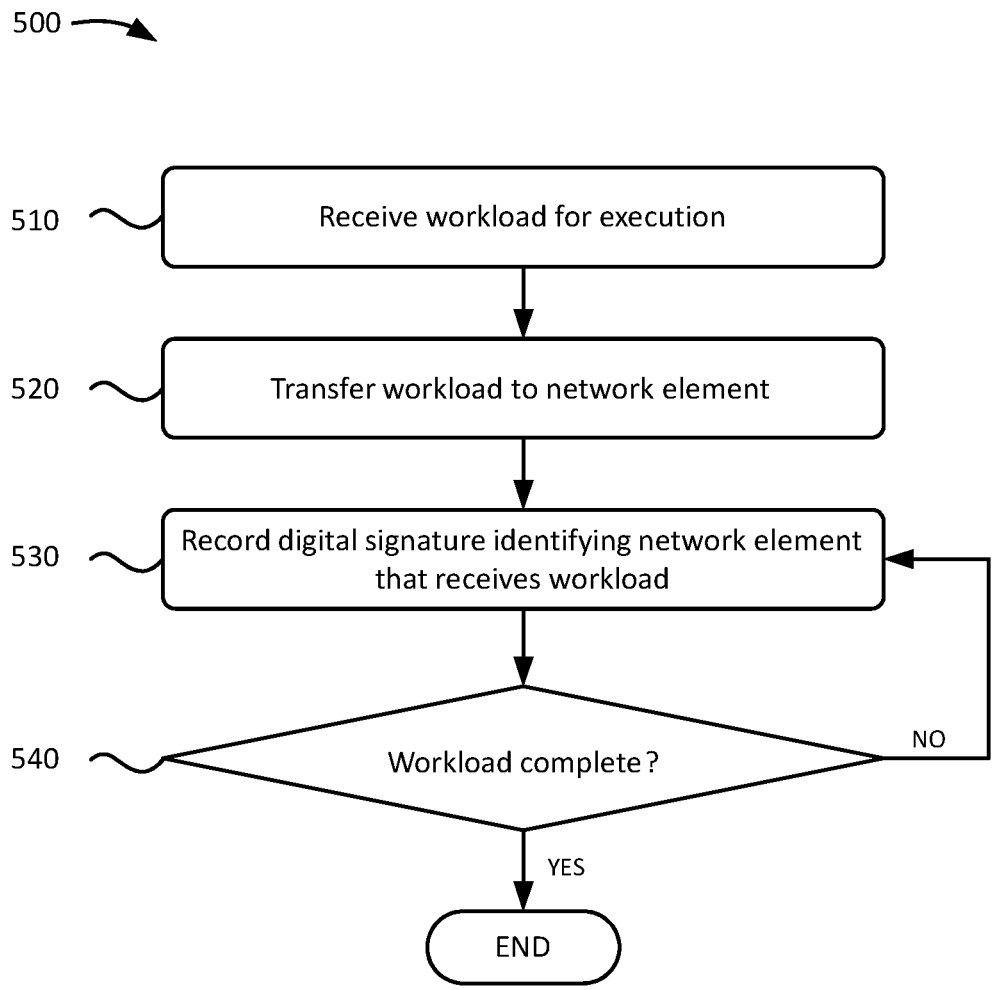
FIG. 5 shows an example flowchart for generating a log for a workload in accordance with aspects of the present disclosure.

FIG. 5 shows an example flowchart for generating a log for a workload in accordance with aspects of the present disclosure. The steps of FIG. 5 may be implemented in the environment of FIGS. 1-4, for example, and are described using reference numbers of elements depicted in FIGS. 1-4.

As noted herein, the flowchart illustrates the architecture, functionality, and operation of possible implementations of systems, methods, and computer program products according to various embodiments of the present disclosure.

As shown in FIG. 5, process 500 receives a workload for execution at step 510. For example, the orchestration server 415 may receive a workload from the client server 410. It is noted, however, that other components may be involved in the receipt of the workload within the cloud network 405.

At step 520, the workload is transferred to a network element 420 within the cloud network 405. For example, the orchestration server 415 may initiate the transfer based on the applications/services required to execute the workload. As an illustrative, non-limiting example, if the workload relates to a modeling application, network elements 420 that process data for the modeling application may be used in the execution of the workload. In embodiments, the orchestration server 415 may analyze the workload to determine which network element 420 to transfer the workload to.

At step 530, information identifying the network element 420 that receives the workload is recorded to the workload. For example, the orchestration server 415 may record identification information regarding the network element 420 in a log associated with the workload. In embodiments, the orchestration server 415 may also record (e.g., in the log) a timestamp indicating a time at which the workload was transferred to the network element 420, and/or duration that the workload was handled by the network element. As an example, the orchestration server 415 may record that the workload was transferred to network element 420-1. In embodiments, the orchestration server 415 may store a workload log in its memory and/or in a memory of an external database. For example, the orchestration server 415 may output the workload log to the workload identification server 430. In embodiments, the orchestration server 415 may digitally sign each entry of the log each time the log is updated. In alternative embodiments, each network element 420 may edit the log indicating that the network element 420 hosted the workload, and may digitally sign the log upon editing the log. In still additional alternative embodiments, the orchestration server 415 may receive digital signatures from each network element 420 that processed the workload. Accordingly, the log may store the digital signature of each network element 420 that processed a workload with timestamp information identifying when each network element 420 processed the workload.

At step 540, additional transfers to other network elements 420 may be provided for the execution of the workload. For example, the workload may be transferred to another network element 420 for processing if the workload is not complete (step 540-NO). If, for example, transfer of the workload to another network element 420 has been provided, process 500 will return to step 530, in which a digital signature of the network element that received the workload is recorded. Further, a timestamp when the workload was transferred to the network element 420 from a previous network element 420 that processed the workload may be recorded. Further, the orchestration server 415 may record a duration of time that the previous network element was in possession of the workload.

Once the workload is completed (step 540-YES), the process ends. The log for the workload will now identify a full trail of the workload's transfer between and within multiple network elements 420 within the cloud network 405. In embodiments, transfer of the workload to another network element 420 will not be needed once the workload has been fully executed.

In embodiments, the log may be generated in a different manner than is described above with respect to FIG. 5. For example, each network element 420 may output information indicating a time at which a workload was in its possession, and when the workload was transferred out of its possession. Also, the log may identify the "chain of custody" of a workload or of a portion of a workload.

Figure 6:
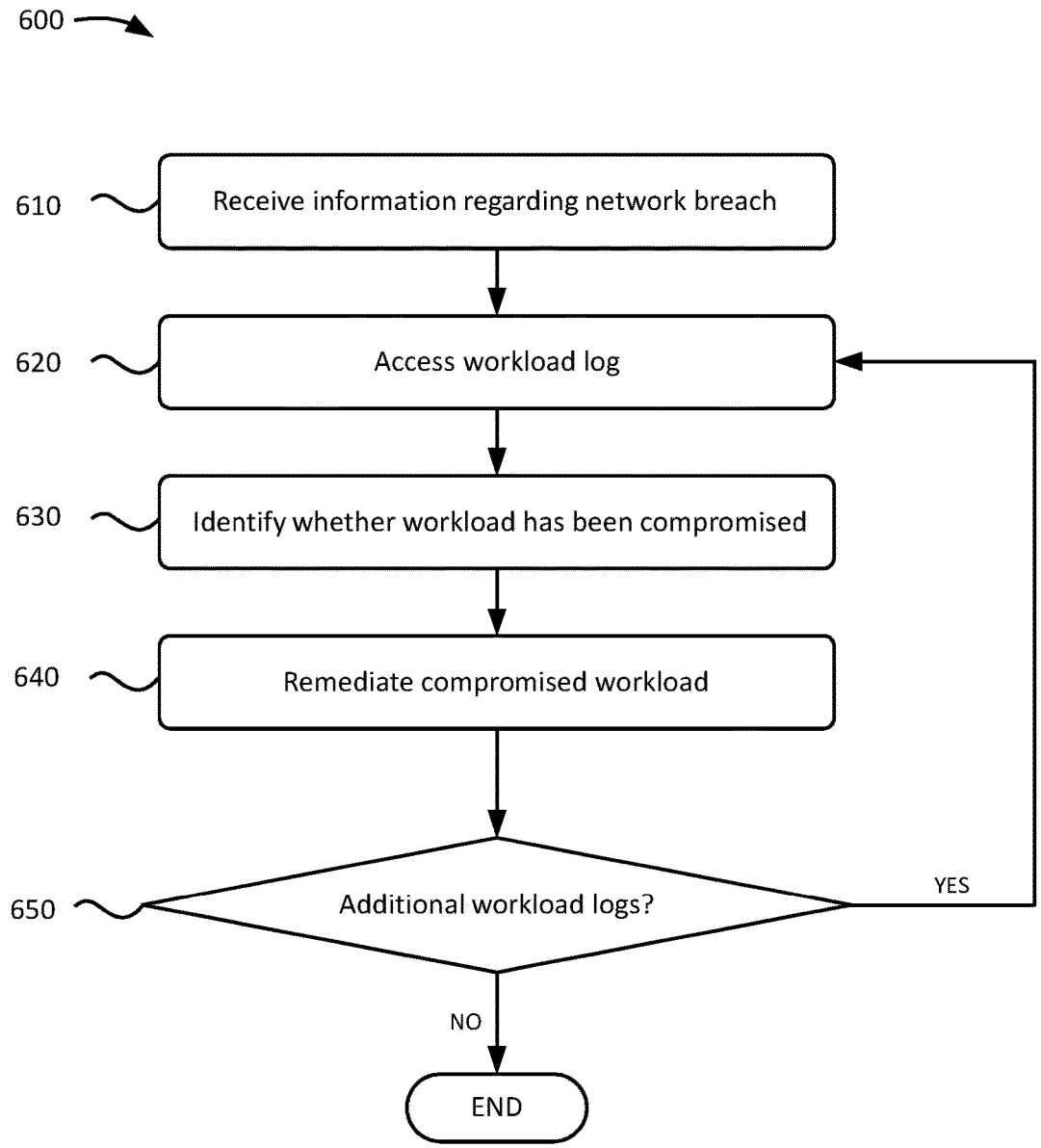
FIG. 6 shows an example flowchart for identifying workloads impacted by a security breach in a provider's cloud network in accordance with aspects of the present disclosure.

FIG. 6 shows an example flowchart for identifying workloads impacted by a security breach in a provider's cloud network. The steps of FIG. 6 may be implemented in the environment of FIGS. 1-4, for example, and are described using reference numbers of elements depicted in FIGS. 1-4. As noted herein, the flowchart illustrates the architecture, functionality, and operation of possible implementations of systems, methods, and computer program products according to various embodiments of the present disclosure.

As shown in FIG. 6, process 600 receives information regarding a security breach at step 610. For example, the workload identification server 430 may receive information regarding the security breach from the network monitoring server 425. In embodiments, the information regarding the security breach may identify particular network elements 420 affected by the security breach, and time periods at which the network elements 420 were compromised.

At step 620, a workload log is accessed for a particular workload. For example, the workload identification server 430 may access a workload log from its memory and/or from an external database. Workload identification server 430 may analyze the workload log to determine whether the workload associated with the log (or a portion of the workload) has traversed through any of the network elements that have been breached in the cloud.

At step 630, the workload log can be used to identify a workload that may have been compromised in a network element impacted by the breach. For example, the workload identification server 430 may identify a workload that was in the possession of a network element 420 at a time at which the network element 420 was compromised by a security breach. In embodiments, the workload identification server 430 may make such a determination based on the information in the workload log that identify the network elements 420 that had possession of the workload at some point in time. In embodiments, the information may include digital signatures of the network elements 420 that had possession of the workload, or may include the identifiers of the network elements 420.

As an example, assume a security breach compromised network element 420-1 at a particular date and time, and that the workload log indicates that the workload was in the possession of the network element 420-1 during the particular date and time. The workload identification server 430 will determine using the workload log that the workload was compromised by the breach. A similar analysis may be done to determine whether the workload was in possession by each compromised network element 420 during a time in which the network elements 420 were compromised.

At step 640, the identified workload is remediated. For example, the workload identification server 430 may quarantine the compromised workload. In embodiments, the workload identification server 430 may output information to the user of the client server 410 to inform the user that the workload has been compromised. The workload log can also be sent to the user of the client server 410 so that the remediation can be effectuated by the user. For example, the user may use the workload log to identify portions of data associated with the workload that need to be quarantined, invalidated, etc. Also, the user of the client server 410 may use the workload log to filter data of the workload that identified one of the network elements 420 that has handled the workload. The user of the client server 410 may then quarantine or invalidate the compromised workload as necessary.

At step 650, a determination is made as to whether additional workload logs exist that need to be analyzed. If there are additional logs at step 650, process 600 returns to step 620 in which a subsequent workload log is accessed and analyzed to determine whether the workload log identifies a network element compromised by the security breach (step 630). If no additional workload logs exist at step 650, process 600 ends.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method comprising:
receiving, by a computing device within a networking environment, a workload for execution within the networking environment;
initiating, by the computing device, transfers of the workload to a plurality of network elements within the networking environment;
providing, by the computing device, tracking information of the workload as the workload traverses through the plurality of network elements;
storing or outputting, by the computing device, the tracking information regarding the workload;
outputting information to a user indicating that the workload has been compromised;
quarantining at least a portion of the workload; and
invalidating data associated with the quarantined portion of the workload.

2. The method of claim 1, wherein the tracking information includes digital signatures corresponding to the plurality of network elements through which the workload traversed the networking environment.

3. The method of claim 1, wherein the tracking information includes timestamp information indicating respective time periods in which the workload traversed through each of the plurality of network elements.

4. The method of claim 1, wherein providing the tracking information includes recording the tracking information in a workload log.

5. The method of claim 4, wherein the workload log includes information identifying the workload as the workload traverses the plurality of network elements within the cloud network.

6. The method of claim 4, wherein providing the tracking information includes digitally signing the workload log.

7. The method of claim 6, further comprising determining whether a security breach affected the workload based on the workload log.

8. The method of claim 4, further comprising determining that a security breach occurred on a particular network element of the plurality of network elements.

9. The method of claim 8, further comprising determining that the security breach affects the workload when the workload log identifies that the workload traversed the particular network element at the time of the security breach.

10. A computer program product for tracking network elements that handled a workload within a networking environment, the computer program product comprising a computer readable storage medium having program instructions embodied therewith, the program instructions executable by a computing device within the networking environment to cause the computing device to:

identify network elements within the networking environment that have been in possession of the workload as part of executing the workload within the networking environment;

provide a digital signature of a workload log of identified network elements for the workload that traversed the identified network elements; and identify, based on the workload log, which network elements, which the workload has traversed through, were compromised;

quarantine at least a portion of the workload; and invalidate data associated with the quarantined portion of the workload.

11. The computer program product of claim 10, wherein the workload log includes receiving digitally signed updates identifying the network elements that have been in possession of the workload.

12. The computer program product of claim 10, wherein the workload log includes timestamps indicating respective time periods at which the workload was possessed by each of the network elements.

13. The computer program product of claim 10, wherein the program instructions further cause the computing device to determine whether a security breach affects the workload based on the workload log.

14. The computer program product of claim 13, wherein the program instructions further cause the computing device to remediate the workload based on determining that the security breach affects the workload.

15. A system comprising:

a CPU, a computer readable memory and a computer readable storage medium associated with a computing device;

program instructions to identify network elements within a networking environment that have been compromised by a security breach;

program instructions to identify a workload which has traversed or been executed on a particular compromised network element based on a workload log;

program instructions to output information to a user indicating that the workload has been compromised;

program instructions to quarantine at least a portion of the workload; and program instructions to invalidate data associated with the quarantined portion of the workload, wherein the program instructions are stored on the computer readable storage medium for execution by the CPU via the computer readable memory.

16. The system of claim 15, wherein identifying that the workload has traversed or been executed on the particular compromised network element is based on timestamps identified in the workload log.

17. The system of claim 16, wherein the timestamps indicate time periods in which the workload was in possessed by the particular compromised network element.

18. The system of claim 15, wherein the workload log identifies network elements within the networking environment that have been in possession of the workload as part of executing the workload within the networking environment.

* * * * *